W. R. McKEEN, Jr.
VALVE GEAR.
APPLICATION FILED JAN. 17, 1907.

1,061,098.

Patented May 6, 1913.
3 SHEETS—SHEET 1.

W. R. McKEEN, Jr.
VALVE GEAR.
APPLICATION FILED JAN. 17, 1907.

1,061,098.

Patented May 6, 1913.
3 SHEETS—SHEET 2.

W. R. McKEEN, Jr.
VALVE GEAR.
APPLICATION FILED JAN. 17, 1907.

1,061,098.

Patented May 6, 1913.
3 SHEETS—SHEET 3.

WITNESSES

INVENTOR
W. R. McKeen Jr.
BY
Duell, Warfield & Duell
ATTORNEYS

UNITED STATES PATENT OFFICE.

WILLIAM R. McKEEN, JR., OF OMAHA, NEBRASKA, ASSIGNOR, BY MESNE ASSIGNMENTS, TO McKEEN MOTOR CAR COMPANY, OF OMAHA, NEBRASKA, A CORPORATION OF NEW JERSEY.

VALVE-GEAR.

1,061,095.　　　Specification of Letters Patent.　　Patented May 6, 1913.

Application filed January 17, 1907. Serial No. 352,727.

*To all whom it may concern:*

Be it known that I, WILLIAM R. McKEEN, Jr., residing at Omaha, in the county of Douglas and State of Nebraska, have invented certain new and useful Improvements in Valve-Gears, of which the following is a full, clear, and exact description, such as will enable others skilled in the art to which it appertains to make and use the same.

This invention relates to valve gear, and, with regard to the more specific features thereof, to the valve gear of internal combustion engines.

One of the objects thereof is to provide simple and efficient gear of the above nature capable of ready variation of the relative times of action or other change of relation of the parts.

Another object is to provide valve driving mechanism characterized by compact and durable construction and silent and efficient running qualities.

Other objects will be in part obvious and in part pointed out hereinafter.

The invention accordingly consists in the features of construction, combinations of elements and arrangement of parts which will be exemplified in the construction herein described and the scope of the application of which will be indicated in the following claims.

Figure 1:
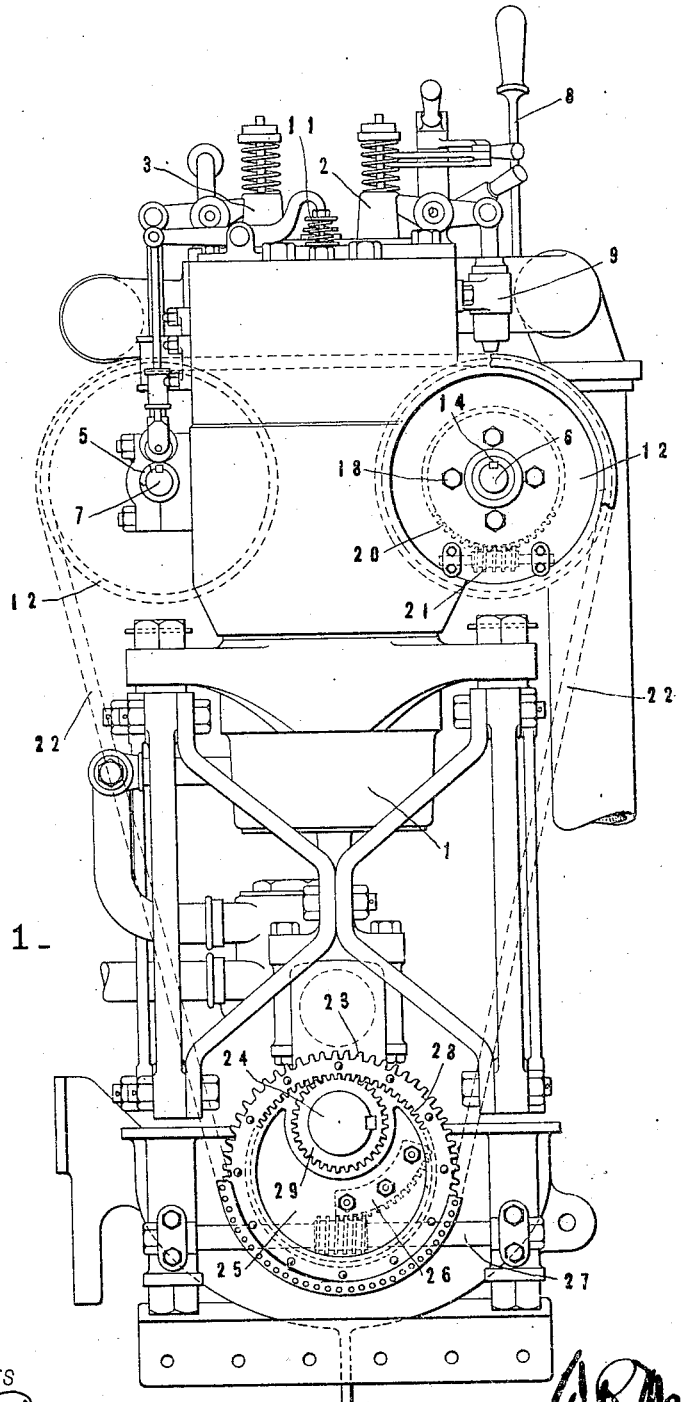
Figure 2:
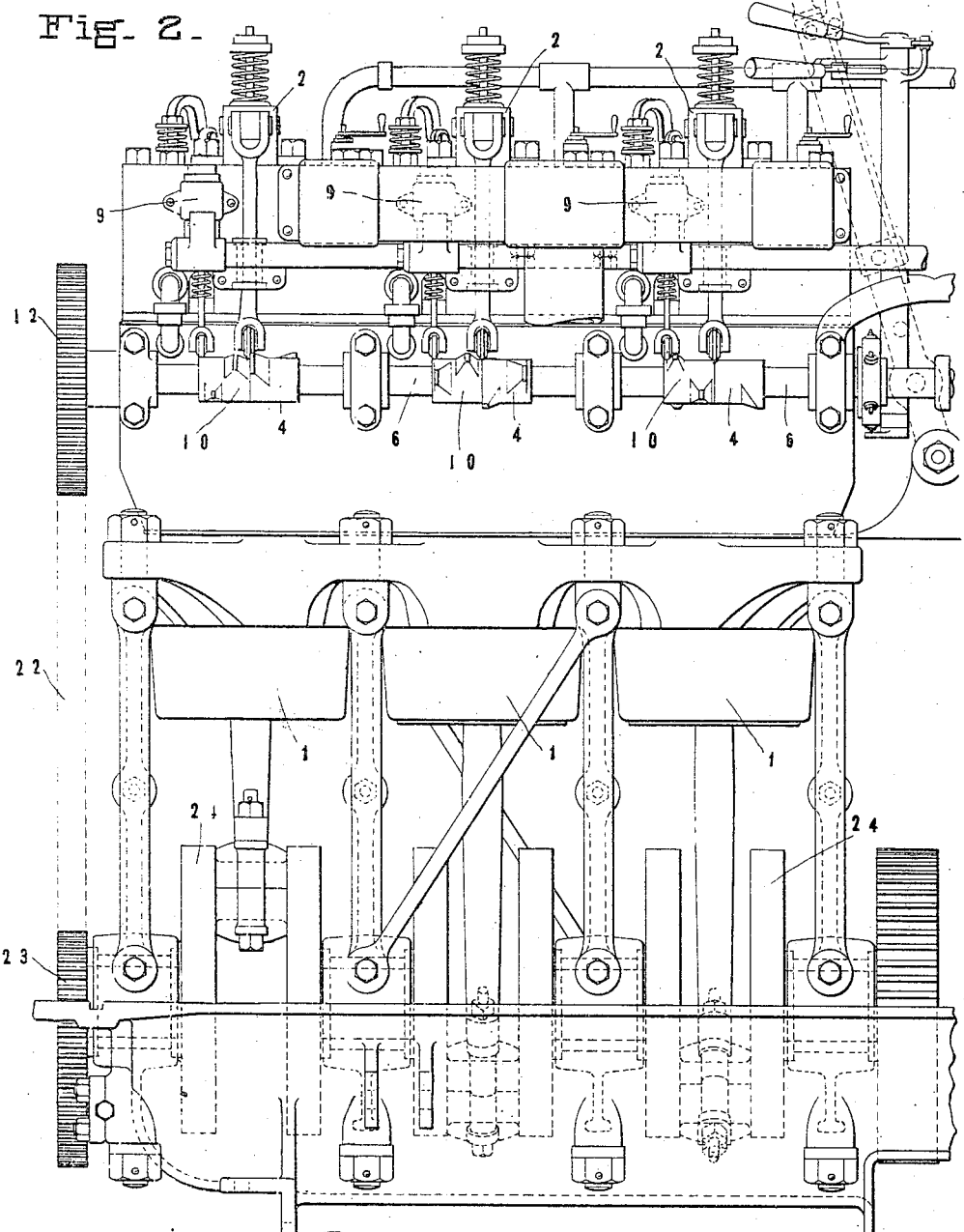
Figure 4:
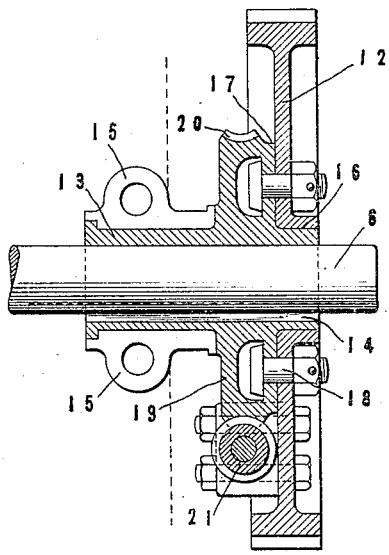
Figure 3:
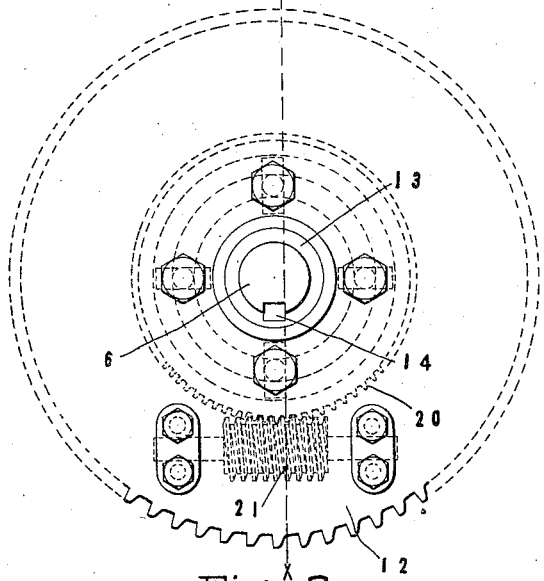
Figure 5:
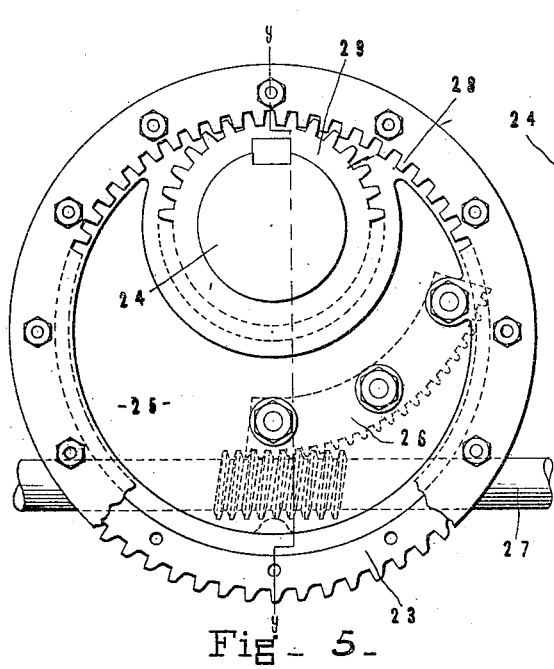
Figure 6:
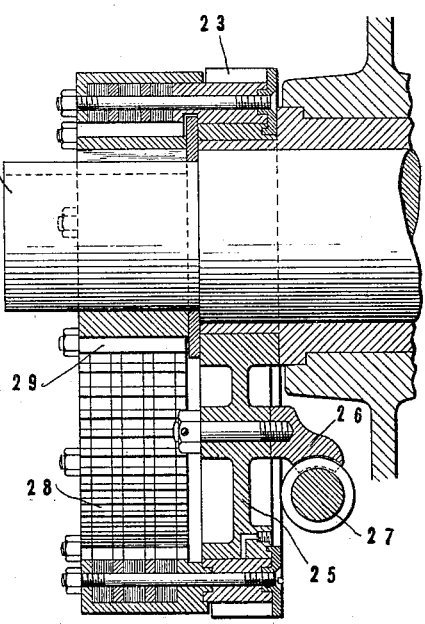

In the accompanying drawings, wherein is shown one of various possible embodiments of my invention,—Figure 1 is an end elevation of an engine; Fig. 2 is a side elevation of the same; Fig. 3 is a detailed end view of a sprocket wheel and associated parts; Fig. 4 is a sectional view taken along the line *x—x* Fig. 3. Fig. 5 is a detailed end view of another sprocket wheel with associated parts; Fig. 6 is a sectional view taken along the line *y—y* Fig. 5.

Similar reference characters refer to similar parts throughout the several views of the drawings.

As tending to render clearer certain aims of this invention and the means whereby they are achieved, it may here be noted that if the action of an internal combustion engine is to be efficient and reliable, it is of prime importance that the valves be actuated at precisely the desired points of time. For this reason, under constant running conditions no change must occur in the times of actuation relative to the cycle of the corresponding cylinder such as might be brought about by slipping or wear of the parts. It is often desirable, nevertheless, that parts of this valve-driving mechanism be readily changeable in relation to the remainder of the apparatus so as to perfect the synchronism of the valves with the desired points of the stroke of the engine or on account of changes in running conditions. This flexibility of control with security of adjustment are dominant features of the construction hereinafter described.

Referring now to Fig. 2 of the drawings, there are shown three cylinders of a multiple cylinder internal combustion engine, upon each cylinder 1 of which are mounted valves, which, as the same are not in themselves of the essence of this invention, will not be described in detail. Briefly stated, the valves 2 and 3 positioned on opposite sides of each cylinder are respectively exhaust and admission valves, for use when the engine is running under the ordinary four cycle internal combustion principle. These valves are respectively operated by cams 4 and 5 upon the cam shafts 6 and 7 which are longitudinally slidable, as by the hand lever 8. These shafts are disposed, as shown, upon opposite sides of the engine whereby crowding of the mechanism is avoided and other advantages are attained. In the extreme positions of these shafts the projecting portions of the cams 4 and 5 are brought into such relation with the co-acting rollers as either to cause a forward or rearward drive of the engine, and in intermediate positions these valves are permitted to remain at rest and thus allow of the driving of the engine, if the same be in motion, by compressed air. The latter method of drive is brought about through the air valve 9 which coacts with projections upon cam 10 with the cam shaft 6 in such position as to permit the valve 2 to remain unaffected. This air valve 9, acting in conjunction with a check valve 11 controlled by a suitable cam upon shaft 7, permits the running of the cylinders of the engine upon the two cycle principle under compressed air, all as is more fully set forth in my co-pending application, Serial No. 378,574, filed June 12th, 1907.

It will be seen from the above description that the means for driving the shafts 6 and 7 must be such as to permit the longitudinal movement thereof, and preferably to permit the change of angular disposition of the several cams with reference to the stroke of the corresponding cylinder of the engine. The above and other ends are attained by the following mechanism:—Upon the end of each of the shafts 6 and 7 are mounted sprocket wheels 12, of which, as the same with their associated parts are identical, one only will be described in detail. Referring particularly to Fig. 4 of the drawing, there is shown mounted upon the end of shaft 6 a sleeve 13 which is slidable with reference thereto, being held in fixed angular relation, as by a key 14. Suitable perforated lugs 15 are provided whereby this sleeve is tied to the frame of the engine and its fixed position thus maintained. Loosely journaled upon the sleeve 13, as at 16, is the sprocket 12, above referred to, which is held against a shoulder 17 as by the bolts 18 passing through the web of the sprocket and suitably curved slots in the sleeve. The latter part is provided with an outwardly projecting portion 19 terminating in a worm-wheel 20 which co-acts with a worm 21 upon the sprocket and is adapted to change the angular relation of these parts, and, consequently, of the sprocket and the shaft upon which the sleeve is mounted. The sprockets 12 are driven by a single chain 22 from a sprocket 23 mounted adjacent the crank shaft 24 of the engine. Sprocket 23 is journaled upon an eccentric 25 loosely mounted upon the crank shaft 24 or upon a sleeve concentric therewith and adjustable about the same through a segment 26 bolted thereto and a worm shaft 27 co-acting therewith and mounted upon the engine frame. The sprocket 23 is provided with an internal gear 28 intermeshing with a spur gear 29 upon shaft 24. These gears, as well as the eccentric 25, are so proportioned and mounted as, upon the eccentric being swung as above set forth, to maintain the teeth accurately in mesh irrespective of the position of this part.

The method of use of the above-described embodiment of my invention is substantially as follows:—The longitudinal movement of shafts 6 and 7 is readily permitted as by the keyed connection therewith of the sleeves 13 as above set forth. If, now, it is desired to shift either of the cam shafts in an angular direction, without disturbing the engine crank and thus the corresponding pistons of the engine, the worm 21 is merely turned to the desired extent and in the desired direction, whereupon the action of these parts is brought exactly into harmony with that of the remainder of the engine and efficient running insured.

The chain 22 furnishes a quiet and efficient form of drive and though subject to the chance of becoming undesirably loose, as through the stretching or wear of the parts, this tendency is readily overcome by the swinging of the eccentric 25 by worm 27 as above set forth. This increases the effective distance between sprocket 23 and the sprockets 12 and thus takes up the slack and places the chain in precisely the condition required for the best performance of its functions.

It will thus be seen that there is provided mechanism in which the objects of this invention are achieved and all of the advantageous features above mentioned are, among others, present. The apparatus is silent in action and of few parts and simple construction. The parts are so disposed as to prevent crowding and yet are positively and efficiently driven from a common source of power. The several changes of relation are accomplished with a minimum of time and labor and when the parts are once set the mechanism is of such character as to insure against slipping and thus render the action of the entire engine thoroughly reliable.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebtween.

While a chain is shown in the drawings, and is preferred because of its greater positiveness in driving, it is manifest that any well-known form of flexible band or belt capable of transmitting motion from one to another of the wheels without slipping, may be used, and is the equivalent of the chain.

Having described my invention, what I claim as new and desire to secure by Letters Patent, is:—

1. In apparatus of the class described, in combination, an internal combustion engine, valve mechanism connected therewith, a shaft adapted to drive said valve mechanism, a pair of sprockets, one of which is mounted upon said shaft and the other of which is adjacent and driven from the crank shaft of the engine, a chain passing over both of said sprockets, and means adapted to adjust the distance between said sprockets and maintain said second sprocket in operative relation to the crank shaft.

2. In apparatus of the class described, in combination, an internal combustion engine, valve mechanism connected therewith, a shaft adapted to drive said valve mechanism, a sprocket mounted upon said shaft, a sprocket mounted adjacent and driven from the crank shaft of the engine, a chain passing over both of said sprockets, and means adapted to swing said second sprocket about said crank shaft and adjust its distance from said first sprocket and maintain the same in operative relation to said crank shaft.

3. In apparatus of the class described, in combination, an internal combustion engine, valve mechanism connected therewith, a shaft adapted to drive said valve mechanism, a sprocket mounted upon said shaft, a sprocket mounted adjacent and driven from the crank shaft of the engine, a chain passing over both of said sprockets, an eccentric controlling the position of said second sprocket, a gear connected with said sprocket, a gear upon said crank shaft intermeshing with said first gear, and means adapted to swing said eccentric to vary the distance between said sprockets and maintain said gears in mesh.

4. In apparatus of the class described, in combination, an internal combustion engine, valve mechanism connected therewith, a shaft adapted to drive said valve mechanism, a sprocket mounted upon said shaft, a sprocket mounted adjacent and driven from the crank shaft of the engine, a chain passing over both of said sprockets, an eccentric controlling the position of said second sprocket, a gear upon said second sprocket, a gear upon the crank shaft co-acting therewith, a fixed member, and a worm and toothed sector or rack interposed between said eccentric and said fixed member adapted to swing said eccentric to vary the distance between said sprockets and maintain said gears in mesh.

5. In apparatus of the class described, in combination, an internal combustion engine, valve mechanism connected therewith, a shaft adapted to drive said valve mechanism, a sprocket mounted upon said shaft, a sprocket mounted adjacent and driven from the crank shaft of the engine, a chain passing over both of said sprockets, a gear connected with said second sprocket, an eccentric upon which said second sprocket and said gear are journaled, a gear upon the crank shaft of the engine co-acting with said first gear, and means adapted to swing said eccentric to vary the distance between said sprockets and maintain said gears in mesh.

6. In apparatus of the class described, in combination, an internal combustion engine, valve mechanism connected therewith, a shaft adapted to drive said valve mechanism, a sprocket mounted upon said shaft, a sprocket mounted adjacent and driven from the crank shaft of the engine, a chain passing over both of said sprockets, an internal gear connected with said second sprocket, an eccentric upon which said sprocket and said gear are journaled, a spur gear upon the crank shaft of the engine co-acting with said internal gear, and means adapted to swing said eccentric to vary the distance between said sprockets and maintain said gears in mesh.

7. In apparatus of the class described, in combination, an internal combustion engine, valve mechanism connected therewith, a shaft adapted to drive said valve mechanism, a sprocket mounted upon said shaft, a sprocket mounted adjacent and driven from the crank shaft of the engine, a chain passing over both of said sprockets, an internal gear connected with said second sprocket, an eccentric upon which said sprocket and said gear are journaled, a spur gear upon the crank shaft of the engine co-acting with said internal gear, a fixed member, and a worm and segment interposed between said eccentric and said fixed member adapted to swing said eccentric to vary the distance between said sprockets and maintain said gears in mesh.

8. In apparatus of the class described, in combination, an internal combustion engine, valve gear connected therewith, a cam shaft adapted to drive said valve gear, a driving member mounted upon said shaft, and means adapted to vary in either direction from any position the angular disposition of said driving member to any desired degree with relation to said shaft and maintain the same in its changed disposition.

9. In apparatus of the class described, in combination, an internal combustion engine, valve gear connected therewith, a cam shaft adapted to drive said valve gear, means adapted to drive said cam shaft from the crank shaft of the engine, and means adapted to vary the time of action of the cams of said cam shaft to any desired degree with relation to the position of the piston of the corresponding engine cylinder and maintains such relation constant subsequent to any change.

10. In apparatus of the class described, in combination, an internal combustion engine, valve gear connected therewith, a cam shaft adapted to drive said valve gear, a driving member mounted upon said shaft, and means adapted to shift said driving member angularly with relation to said shaft and maintain the same in shifted position, said means comprising a worm and wheel interposed between said driving member and the shaft upon which it is mounted.

11. In apparatus of the class described, in combination, an internal combustion engine, valve gear connected therewith, a cam shaft adapted to drive said valve gear, a driving member loosely mounted upon said cam shaft, a member secured to said cam shaft and provided with a worm wheel, and a worm meshing with said worm wheel and mounted upon said driving member.

12. In apparatus of the class described, in combination, an internal combustion engine, valve gear connected therewith, a cam shaft adapted to drive said valve gear, a driving member loosely mounted upon said cam shaft, a member secured to said cam shaft and provided with a worm wheel, a worm meshing with said worm wheel and mounted upon said driving member, and means adapted to prevent bodily movement of said driving member and said second member and to permit relative rotary movement thereof.

13. In apparatus of the class described, in combination, an internal combustion engine, valve gear connected therewith, a cam shaft adapted to drive said valve gear, a driving member mounted upon said shaft and slidable with relation thereto, means adapted to shift said shaft longitudinally with respect to said valve gear and said driving member, and means adapted to change the angular relation of said driving member with respect to the shaft and maintain the same in changed relation.

14. In apparatus of the class described, in combination, an internal combustion engine, valve mechanism connected therewith, a pair of cam shafts adapted to drive said valve mechanism, sprockets connected with said cam shafts, a third sprocket driven by the crank shaft of the engine, a chain connecting said sprockets and adapted to drive said cam shafts from the crank shaft of the engine, and means adapted to vary the distance between said first sprockets and said third sprocket and maintain said third sprocket in operative relation to the crank shaft.

15. In apparatus of the class described, in combination, an internal combustion engine, valve mechanism connected therewith, a pair of cam shafts disposed upon opposite sides of the cylinder of said engine and adapted to drive said valve mechanism, a sprocket upon each of said cam shafts, a sprocket adjacent the crank shaft of the engine, a single chain passing over said three sprockets and adapted to drive said cam shafts from said crank shaft, and means adapted to swing said last-mentioned sprocket about said crank shaft and vary its distance from said first sprockets and maintain the same in operative relation to the crank shaft.

16. In apparatus of the class described, in combination, an internal combustion engine, valve mechanism connected therewith, a pair of cam shafts disposed upon opposite sides of the cylinder of said engine and adapted to drive said valve mechanism, a sprocket upon each of said cam shafts, a sprocket adjacent the crank shaft of the engine, a single chain passing over said three sprockets and adapted to drive said cam shafts from said crank shaft, an eccentric controlling the position of said last-mentioned sprocket, a gear connected with said last-mentioned sprocket, a gear upon said crank shaft intermeshing with said first gear, and means adapted to swing said eccentric to vary the distance between said last sprocket and said first sprockets and maintain said gears in mesh.

17. In apparatus of the class described, in combination, an internal combustion engine, valve mechanism connected therewith, a pair of cam shafts adapted to drive said valve mechanism, driving members mounted upon said shafts and slidable with reference thereto, means adapted to shift said shafts longitudinally with respect to said valve mechanism and said driving members, a source of power, and means connecting each of said driving members directly with said source of power.

18. In apparatus of the class described, in combination, an internal combustion engine, valve mechanism connected therewith, a pair of cam shafts adapted to drive said valve mechanism, sprockets mounted upon said cam shafts, a third sprocket driven by the crank shaft of the engine, a chain connecting said sprockets and adapted to drive said cam shafts from the crank shaft of the engine, and means adapted to shift said first-mentioned sprockets angularly with relation to the shafts upon which they are mounted and maintain the same in shifted position.

19. In apparatus of the class described, in combination, an internal combustion engine, valve mechanism connected therewith, a pair of cam shafts adapted to drive said valve mechanism, sprockets connected with said cam shafts, a third sprocket driven by the crank shaft of the engine, a chain connecting said sprockets and adapted to drive said cam shafts from the crank shaft of the engine, a member mounted upon each of said cam shafts adjacent said first-mentioned sprockets, and means comprising a worm and wheel interposed between each of said members and the corresponding sprockets adapted to shift said sprockets angularly with relation to the shafts upon which they are mounted.

20. In apparatus of the class described, in combination, an internal combustion engine, valve mechanism connected therewith, a shaft adapted to drive said valve mechanism, a pair of sprockets one of which is mounted upon said shaft and the other of which is adjacent and driven from the crank shaft of the engine, a chain passing over both of said sprockets, means adapted to vary the distance between said sprockets and maintain said second sprocket in operative relation to the crank shaft, and means adapted to shift one of said sprockets angularly with relation to said first-mentioned shaft and maintain the same in shifted position.

21. In apparatus of the class described, in combination, an internal combustion engine, valve mechanism connected therewith, a shaft adapted to drive said valve mechanism, a sprocket mounted upon said shaft, a sprocket mounted adjacent and driven from the crank shaft of the engine, a chain passing over both of said sprockets, means adapted to swing said second sprocket about said crank shaft and vary its distance from said first sprocket and maintain the same in operative relation to said crank shaft, and means adapted to shift said first sprocket angularly with relation to the shaft upon which it is mounted and maintain the same in shifted position.

22. In apparatus of the class described, in combination, an internal combustion engine, valve mechanism connected therewith, a shaft adapted to drive said valve mechanism, a sprocket mounted upon said shaft, a sprocket mounted adjacent and driven from the crank shaft of the engine, a chain passing over both of said sprockets, an eccentric controlling the position of said second sprocket, a gear connected with said sprocket, a gear upon said crank shaft intermeshing with said first gear, means adapted to swing said eccentric to vary the distance between said sprockets and maintain said gears in mesh, and means adapted to shift said first sprocket angularly with relation to the shaft upon which it is mounted and maintain the same in shifted position.

23. In apparatus of the class described, in combination, an internal combustion engine, valve mechanism connected therewith, a shaft adapted to drive said valve mechanism, a sprocket mounted upon said shaft, a sprocket mounted adjacent and driven from the crank shaft of the engine, a chain passing over both of said sprockets, means adapted to swing said second sprocket about said crank shaft and vary its distance from said first sprocket and maintain the same in operative relation to said crank shaft, and means comprising a worm and wheel interposed between said first sprocket and the shaft upon which it is mounted, adapted to shift said sprocket angularly with relation to said shaft and maintain the same in shifted position.

24. In apparatus of the class described, in combination, an internal combustion engine, valve mechanism connected therewith, a shaft adapted to drive said valve mechanism, a sprocket mounted upon said shaft, a sprocket mounted adjacent and driven from the crank shaft of the engine, a chain passing over both of said sprockets, an eccentric controlling the position of said second sprocket, a gear connected with said sprocket, a gear upon said crank shaft intermeshing with said first gear, means adapted to swing said eccentric to vary the distance between said sprockets and maintain said gears in mesh, and means comprising a worm and wheel interposed between said first sprocket and the shaft upon which it is mounted adapted to shift said sprocket angularly with relation to said shaft and maintain the same in shifted position.

25. In apparatus of the class described, in combination, an internal combustion engine, valve mechanism connected therewith, a pair of cam shafts disposed upon opposite sides of the cylinder of said engine and adapted to drive said valve mechanism, a sprocket upon each of said shafts, means interposed between each of said sprockets and the corresponding shaft adapted to shift said sprockets angularly with respect to the corresponding shafts and maintain the same in shifted position, a sprocket adjacent the crank shaft of the engine, an eccentric controlling the position of said last-mentioned sprocket, a gear upon said last-mentioned sprocket, a gear upon the crank shaft co-acting therewith, means adapted to swing said eccentric to vary the distance between said last-mentioned sprocket and said first-mentioned sprockets and maintain said gears in mesh, and a chain passing over said three sprockets and adapted to drive said cam shafts from the crank shaft of the engine.

26. In apparatus of the class described, in combination, an internal combustion engine, valve mechanism connected therewith, a pair of cam shafts disposed upon opposite sides of the cylinder of said engine and adapted to drive said valve mechanism, a sprocket upon each of said shafts, means interposed between each of said sprockets and the corresponding shaft adapted to shift said sprockets angularly with respect to the corresponding shafts and maintain the same in shifted position, a sprocket adjacent the crank shaft of the engine, an eccentric controlling the position of said last-mentioned sprocket, a gear upon said last-mentioned sprocket, a gear upon the crank shaft coacting therewith, means adapted to swing said eccentric to vary the distance between said last-mentioned sprocket and said first-mentioned sprockets and maintain said gears in mesh, a chain passing over said three sprockets and adapted to drive said cam shafts from the crank shaft of the engine, and means adapted to shift said cam shafts longitudinally with respect to the sprockets mounted thereon.

In testimony whereof I affix my signature, in the presence of two witnesses.

WILLIAM R. McKEEN, Jr.

Witnesses:
H. P. Van Arsdale,
C. W. Loucks.